United States Patent
Spaggiari

(10) Patent No.: US 8,257,058 B2
(45) Date of Patent: Sep. 4, 2012

(54) ELECTRIC VENTILATOR WITH UNIT FOR CONTROLLING SPEED LOCATED IN A CONTAINER SURROUNDING THE MOTOR

(75) Inventor: Alessandro Spaggiari, Correggio (IT)

(73) Assignee: Spal Automotive S.r.L. (IT)

( * ) Notice: Subject to any disclaimer, the term of this patent is extended or adjusted under 35 U.S.C. 154(b) by 322 days.

(21) Appl. No.: 12/601,580

(22) PCT Filed: May 28, 2008

(86) PCT No.: PCT/IB2008/001399
§ 371 (c)(1),
(2), (4) Date: Nov. 24, 2009

(87) PCT Pub. No.: WO2008/146152
PCT Pub. Date: Dec. 4, 2008

(65) Prior Publication Data
US 2010/0158719 A1    Jun. 24, 2010

(30) Foreign Application Priority Data
May 31, 2007 (IT) .............................. BO2007A0382

(51) Int. Cl.
*F04B 39/12* (2006.01)
(52) U.S. Cl. .................................. 417/350; 417/423.14
(58) Field of Classification Search .................. 417/350, 417/360, 423.14, 423.5; 415/101; 454/205
See application file for complete search history.

(56) References Cited

U.S. PATENT DOCUMENTS

| 1,906,533 | A | * | 5/1933 | Burke | 417/350 |
| 2,251,553 | A | * | 8/1941 | Redmond | 417/350 |
| 2,275,564 | A | * | 3/1942 | Shawhan et al. | 454/205 |
| 3,120,340 | A | * | 2/1964 | Strumpell | 417/350 |
| 3,874,191 | A | * | 4/1975 | Hudson | 62/426 |
| 4,171,190 | A | * | 10/1979 | Hudson | 417/350 |
| 4,746,266 | A | * | 5/1988 | Kirchner et al. | 415/119 |
| 4,902,203 | A | * | 2/1990 | Sager | 417/350 |
| 5,111,738 | A | * | 5/1992 | Becquerel | 454/159 |
| 5,403,163 | A | * | 4/1995 | Murphy | 417/350 |
| 6,896,478 | B2 | * | 5/2005 | Botros et al. | 415/101 |
| 2006/0140796 | A1 | * | 6/2006 | Cheng | 417/423.5 |

FOREIGN PATENT DOCUMENTS

DE          2508740 A   *  9/1976
(Continued)

OTHER PUBLICATIONS

Written Opinion and Search Report of the European Searching Authority from counterpart PCT application.

*Primary Examiner* — Devon Kramer
*Assistant Examiner* — Nathan Zollinger
(74) *Attorney, Agent, or Firm* — Timothy J. Klima; Shuttleworth & Ingersoll, PLC

(57) ABSTRACT

An electric ventilator (1) comprises a frame (2), a pair of centrifugal fans (3) mounted on the frame (2), an electric motor (4) for driving the fans (3) and axially interposed between the fans (3), and a unit (5) for controlling the speed of the motor (4); the speed control unit (5) comprises a plurality of electrical switching resistors (7) housed in a box-shaped container (8) that can be closed and sealed; the container (8) is mounted on the frame (2) and has the shape of a bridge so as to surround the casing (13) of the motor (4) without touching it.

8 Claims, 3 Drawing Sheets

FOREIGN PATENT DOCUMENTS

| | | |
|---|---|---|
| DE | 8914525 | 1/1990 |
| DE | 20308886 U1 * | 11/2004 |
| EP | 0985829 | 3/2000 |
| EP | 1484509 | 12/2004 |
| FR | 2302426 | 9/1976 |
| FR | 2584146 | 1/1987 |

* cited by examiner

ELECTRIC VENTILATOR WITH UNIT FOR CONTROLLING SPEED LOCATED IN A CONTAINER SURROUNDING THE MOTOR

This application is the National Phase of International Application PCT/IB2008/001399 filed May 28, 2008 which designated the U.S. and that International Application was published under PCT Article 21(2) in English.

This application claims priority to Italian Patent Application No. BO2007A000382 filed May 31, 2007, and PCT Application No. PCT/IB2008/001399 filed May 28, 2008, which applications are incorporated by reference herein.

TECHNICAL FIELD

This invention relates to an electric ventilator of the type comprising a frame, a pair of centrifugal fans mounted on the frame, an electric motor for driving the fans, and a unit for controlling the speed of the motor.

BACKGROUND ART

Electric ventilators of this kind are commonly used in systems for heating or air conditioning rooms or vehicle cabins. In electric ventilators of this kind, the mounting frame is also the part that conveys the air flow produced by the fans.

In prior art electric ventilators, the speed control unit usually comprises a plurality of electrical resistors switched by a remote control selector switch, mounted on the motor's outer casing and suitably insulated from the latter.

This solution is not free of disadvantages: firstly, the resistors are exposed to shocks, dirt, dust, liquids etc.; secondly, the vibrations of the motor casing are transmitted directly to the resistors and, some cases, cause them to be disconnected from the electrical control circuit.

Especially when speed control units of this kind are used in the heating or ventilation systems of earthmoving machines and the like, exposure of the resistors to vibrations, shocks and dirt constitutes a serious drawback.

DISCLOSURE OF THE INVENTION

In this context, the main purpose of the present invention is to propose an electric ventilator which is free of the above mentioned disadvantages.

According to the invention, the above mentioned aim is achieved by an electric ventilator as described in the appended claims.

BRIEF DESCRIPTION OF THE DRAWINGS

The invention will now be described with reference to the accompanying drawings which illustrate a preferred embodiment of it and in which.

DETAILED DESCRIPTION OF THE PREFERRED EMBODIMENTS OF THE INVENTION

Figure 1:
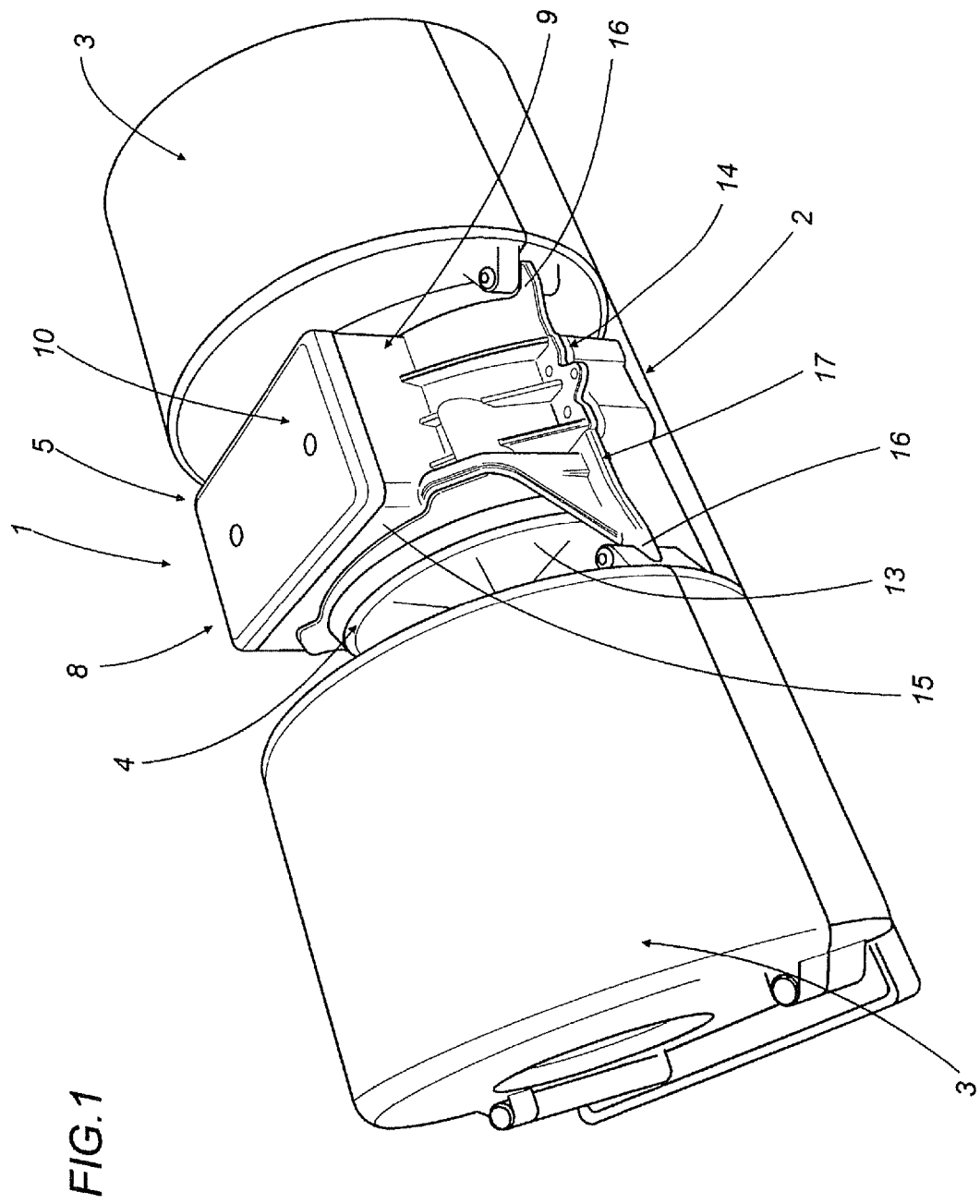
FIG. 1 is a perspective view of a preferred embodiment of the electric ventilator according to this invention.

With reference to FIG. 1, the numeral 1 denotes in its entirety an electric ventilator suitable for use in the heating or air conditioning systems of rooms or vehicle cabins.

The electric ventilator 1 comprises a frame 2 substantially in the shape of a rectangular parallelepiped, a pair of centrifugal fans 3 mounted on the frame 2, an electric motor 4 for driving the fans 3 and axially interposed between the fans 3, and a unit 5 for controlling the speed of the motor 4.

Figure 3:
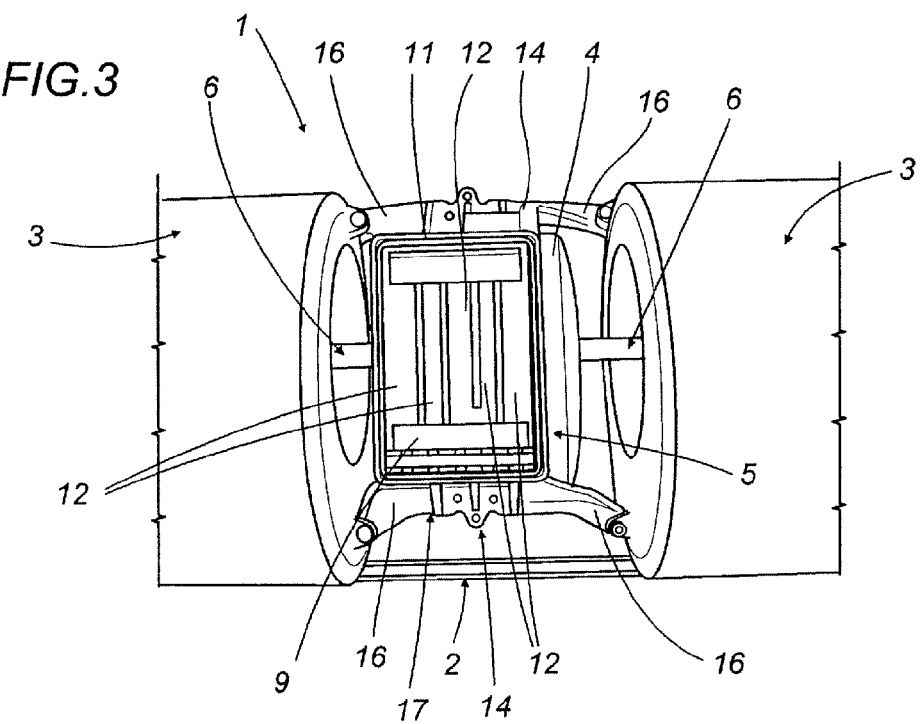
FIG. 3 is a top view of the detail of FIG. 2.
Figure 4:
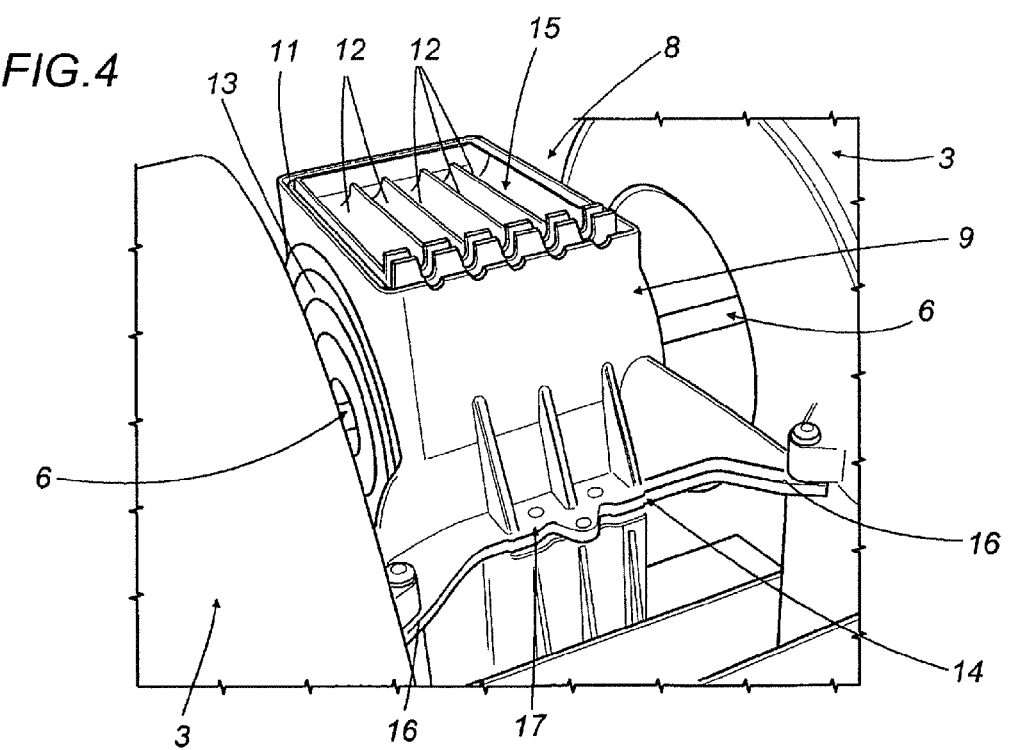
FIG. 4 is a different perspective view of the detail of FIG. 2.

The frame 2 also serves as the part that conveys the air flow produced by the fans 3. Looking at FIG. 3, the air flow is transversal to the output shaft 6 of the motor 4 and, more specifically, is directed orthogonally towards the plane in which FIG. 3 is drawn. For conveying the air flow, the frame 2 comprises two openings (not illustrated) located at the fans 3.

The frame 2, fans 3 and motor 4 are outside the scope of this invention and, being of known type, are not described in detail below.

Figure 2:
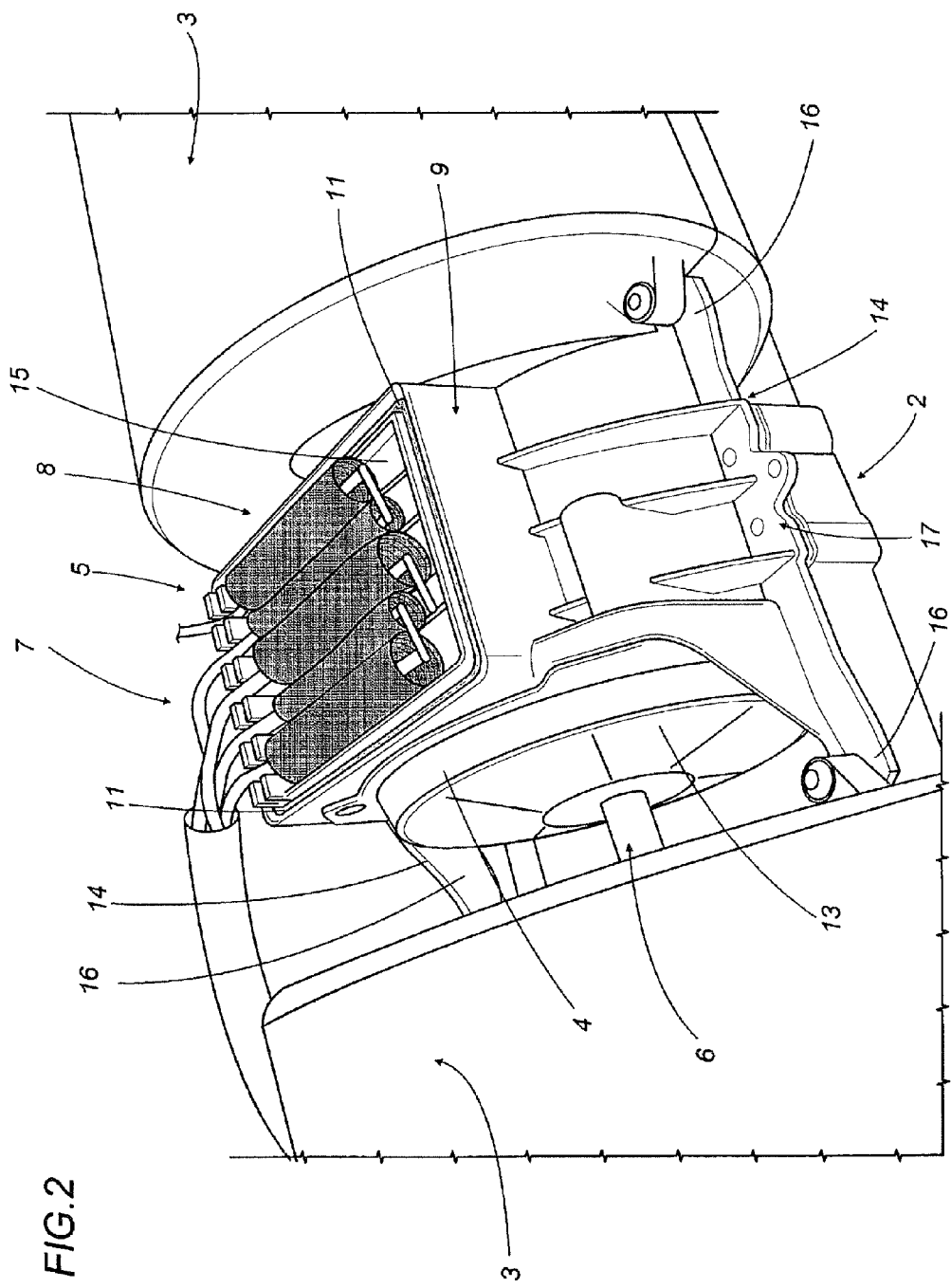
FIG. 2 is an enlarged perspective view, with some parts cut away for clarity, showing a detail from FIG. 1.

The unit 5 for controlling the speed of the motor 4 comprises a plurality of electrical resistors 7 (FIG. 2) switched by a remote control selector switch (of known type and not illustrated).

The electrical resistors 7 are housed in a sealed, box-shaped container 8 made of a rigid, electrically insulating material, preferably plastic.

The container 8 comprises two half-shells 9, 10 coupled to each other (by screwing) and sealed, with an interposed annular sealing gasket 11 (for example, an O-ring).

The first half-shell 9 defines a plurality of housings 12 designed to accommodate the respective electrical resistors 7 while the second half-shell 10 is a lid for covering the housings 12. More specifically, the half-shell 10 is embodied by a rectangular plate.

Besides constituting a rigid, sealed casing for accommodating the electrical resistors 7, the container 8 has another characteristic feature, which is that it is mounted on the frame 2 and has the shape of a bridge so as to surround the casing 13 of the motor 4 but without touching it.

In particular, the first half-shell 9 is bridge shaped and surrounds the casing 13 at a minimum distance.

More specifically, the surface of the first half-shell 9 facing the motor casing 13 is shaped to match the shape of the part of the casing 13 it is mounted on.

The first half-shell 9 is located on the side of the frame 2 opposite the motor 4 and comprises two piles 14 fixed to the frame 2. The piles 14 support a central portion 15 of the first half-shell 9 in which the housing 12 are formed.

Each pile 14 extends between the fans 3 where the pile 14 itself is fixed to the frame 2. More specifically, each pile 14 has two arms 16 for anchoring it (by screwing) to the frame 2.

In particular, the two piles 14, together with the first half shell 9, define a supporting and stiffening structure 17 designed to support the resistors 7 (FIG. 2) housed in the half-shell while at the same time damping vibrations and stiffening the frame 2.

The invention described above may be modified and adapted in several ways without thereby departing from the scope of the inventive concept, as defined in the claims herein.

Moreover, all the details of the invention may be substituted by technically equivalent elements.

LIST OF REFERENCE CHARACTERS

1 electric ventilator
2 frame
3 centrifugal fans
4 electric motor
5 motor speed control unit
6 motor output shaft
7 electrical resistors 8 container
9 half-shell
10 half-shell
11 annular sealing gasket
12 housings
13 motor casing
14 piles
15 central portion of first half shell
16 anchoring arms
17 supporting and stiffening structure

The invention claimed is:

1. An electric ventilator comprising:
a frame,
a pair of fans mounted on the frame,
an electric motor for driving the fans (3) and axially interposed between the fans, the motor having a casing, and
a unit for controlling a speed of the motor; the unit comprising a plurality of electrical switching resistors, and
a box-shaped container that can be closed and sealed, and in which the electrical switching resistors are housed, the container comprising two half-shells that can be coupled to each other,
wherein a first half-shell of the two half-shells has a shape of a bridge and surrounds the casing of the motor without touching it.

2. The electric ventilator according to claim 1, wherein the container is made of a rigid material.

3. The electric ventilator according to claim 1, wherein the container is made of an electrically insulating material.

4. The electric ventilator according to claim 1, and further comprising a sealing gasket interposed between the two half-shells.

5. The electric ventilator according to claim 1, wherein the container is mounted on the frame.

6. The electric ventilator according to claim 1, wherein the first half-shell is located on a side of the frame opposite the motor and comprises two piles fixed to the frame.

7. The electric ventilator according to claim 6, wherein each pile extends between the fans and is fixed to the frame.

8. The electric ventilator according to claim 7, wherein the first half-shell and the piles define a stiffening and vibration damping structure.

* * * * *